United States Patent [19]

Cooley

[11] 3,898,294
[45] Aug. 5, 1975

[54] CHLOROPRENE PROCESS IMPROVEMENT
[75] Inventor: Stone D. Cooley, Houston, Tex.
[73] Assignee: Petro-Tex Chemical Corporation, Houston, Tex.
[22] Filed: Nov. 6, 1972
[21] Appl. No.: 304,139

[52] U.S. Cl. ............................. 260/655; 260/654 D
[51] Int. Cl. ............................................. C07c 21/20
[58] Field of Search ............ 260/655, 654 D, 654 S, 260/652.5 P

[56] References Cited
UNITED STATES PATENTS
2,948,761  8/1960  Jenkins ........................ 260/652.5 P
3,188,357  6/1965  Blumbergs ...................... 260/654 D
3,754,044  8/1973  Hargreaves et al. ............. 260/654 D Primary Examiner—Delbert E. Gantz
Assistant Examiner—Joseph A. Boska
Attorney, Agent, or Firm—N. Elton Dry; Kenneth H. Johnson

[57] ABSTRACT

Reduced fouling in the apparatus for stripping residual organics from the byproduct aqueous salt solution produced in the dehydrohalogenation of halogenated hydrocarbons especially those containing 4 carbon atoms and reduced fouling in the apparatus used in purifying the dehydrohalogenated products produced are accomplished by the addition of formaldehyde or paraformaldehyde to the aqueous salt solution.

6 Claims, 1 Drawing Figure

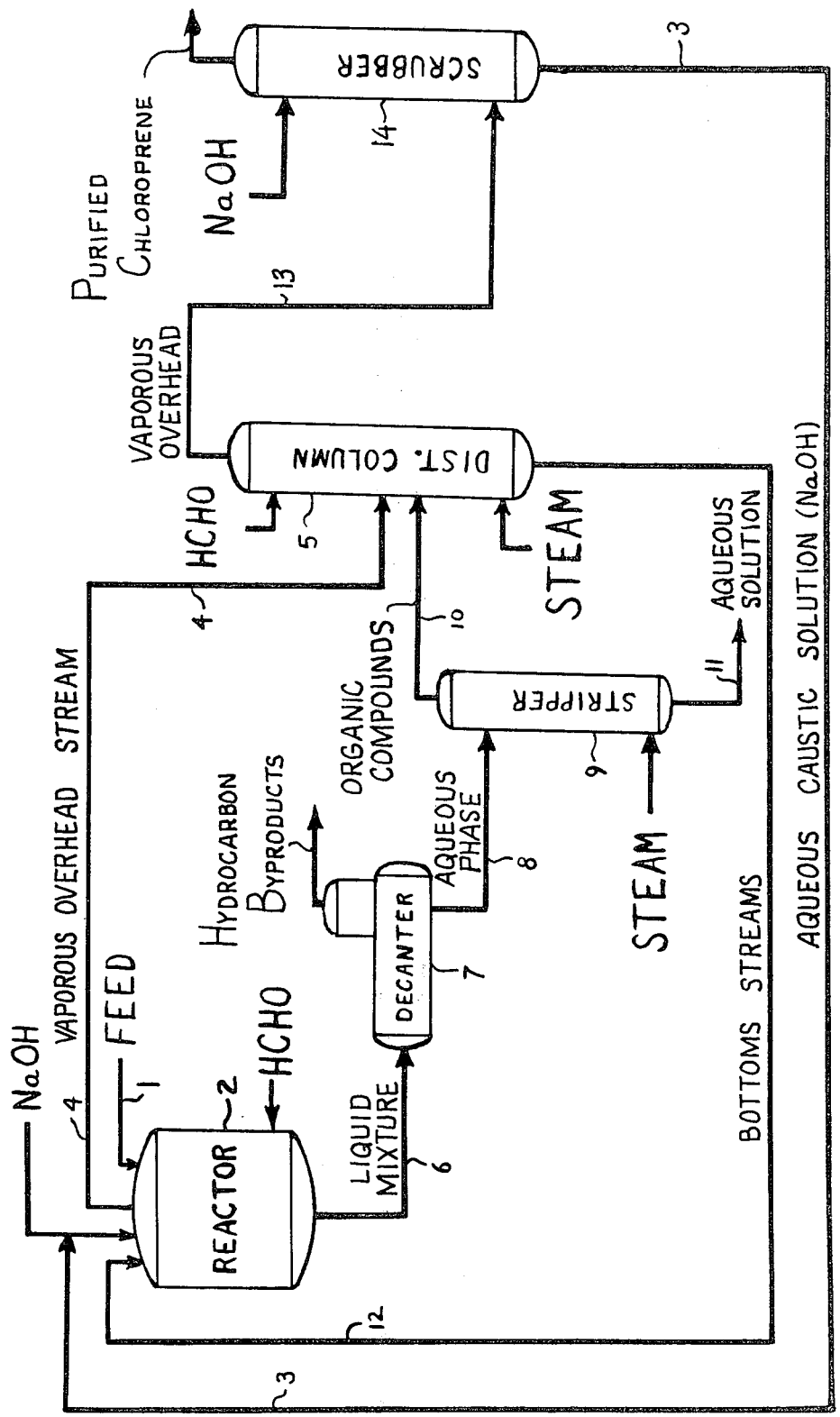

CHLOROPRENE PROCESS IMPROVEMENT

BACKGROUND OF THE INVENTION

1. Field of the Invention

This application relates to the process of dehydrochlorinating a halogenated hydrocarbon, preferably a 4 carbon containing compound and in particular compounds selected from the group consisting of 1,2,3,4-tetrachlorobutane, 2,3,4-trichlorobutene-1 and 3,4-dichlorobutene-1. Representative of such process is the dehydrochlorination of 3,4-dichlorobutene-1 with caustic to produce 2-chlorobutadiene-1,3, hereinafter referred to as chloroprene. More particularly, the application relates to the treatment of the aqueous salt solution from the dehydrochlorination reaction for the removal of residual organic materials from this aqueous salt solution and the purification of the dehydrohalogenated compound produced in the dehydrochlorination reaction.

2. Description of the Prior Art

Chloroprene is produced commercially by reacting 3,4-dichlorobutene-1 with caustic to produce a two-phase mixture comprising chloroprene, sodium chloride and water. The organic phase, containing the major portion of the chloroprene together with unreacted 3,4-dichlorobutene-1, is forwarded on to purification processes wherein the chloroprene is separated from the other constituents. The aqueous phase containing sodium hydroxide, water and residual amounts of chloroprene and other organic constituents is subjected to steam stripping whereby chloroprene and other organic materials are recovered and the aqueous solution then discarded. However, in these processes, considerable difficulty has been encountered by fouling and plugging of the steam stripping apparatus with polymeric type material. It is an object of this invention to provide means to minimize the fouling and plugging in the apparatus.

SUMMARY OF THE INVENTION

Dehydrohalogenated hydrocarbon compounds such as chloroprene and 2,3-dichlorobutadiene-1,3 are produced in improved processes wherein the aqueous phase from the dehydrohalogenation reaction has incorporated therein prior to steam distillation thereof a sufficient amount of formaldehyde or a precursor of formaldehyde such as paraformaldehyde to prevent formation of polymeric material therein. In addition, the dehydrohalogenated product stream can also be treated with fomaldehyde or paraformaldehyde if necessary to prevent the formation of such polymeric material in the apparatus used to purify the product.

BRIEF DESCRIPTION OF THE DRAWING

One preferred method of conducting the process of this invention is illustrated in the drawing.

An organic feed comprising a halogenated hydrocarbon such as 1,2,3,4-tetrachlorobutane, 3,4-dichlorobutene-1 or 2,3,4-trichlorobutene-1 is fed to reactor 2 through conduit 1. An aqueous solution of an alkali metal or alkaline earth metal hydroxide is introduced into reactor 2 through conduit 3. A vaporous overhead stream comprising dehydrohalogenated compound, unreacted hydrocarbon and water is withdrawn from reactor 2 through conduit 4 and forwarded to distillation column 5. A liquid mixture 6 comprising water, hydroxide, salt, dehydrohalogenated compounds, unreacted hydrocarbons and hydrocarbon byproducts is withdrawn from reactor 2 through conduit 6 and fed to decanter 7 wherein an aqueous phase comprising hydroxide, salt and a small amount of dehydrochlorinated compounds and unreacted hydrocarbons separates from the organic phase. The organic phase comprising largely hydrocarbon byproducts is disposed of, such as by incineration. The aqueous phase is forwarded from decanter 7 to stripping column 9 through conduit 8. Residual hydrocarbons in the aqueous phase are distilled overhead of column 9 and fed forward to distillation column 5 through conduit 10. Steam is introduced directly into stripping column 9 as the heat source. Condensed steam and the aqueous alkali and salt containing solution are withdrawn from the bottoms of the stripping column through conduit 11 and discarded.

The overhead stream from reactor 2 and the overhead stream from stripping column 9 are introduced into distillation column 5. Steam is added directly to the distillation column 5 to supply the heat necessary for the distillation step. A bottoms stream comprising predominantly unreacted hydrocarbons is withdrawn from distillation column 5 and returned to reactor 2 through conduit 12. The overhead stream comprising predominantly of the dehydrohalogenated organic compounds is fed forward through conduit 13 to scrubber 14 wherein the stream is contacted with an aqueous solution of the alkali metal or alkaline earth metal hydroxide to further purify the dehydrohalogenated compounds. The aqueous scrubber solution is then returned to reactor 2 through conduit 3. Additional hydroxide solution as required in reactor 2 can be added to the solution in conduit 3. The purified compounds from scrubber 14 are forwarded on to storage or further processing not shown in the drawing. According to the present invention, formaldehyde or paraformaldehyde is added to the liquid mixture in reactor 2 and optionally to the distillation column 5.

DESCRIPTION OF THE PREFERRED EMBODIMENT

The invention will be more specifically described with reference to the accompanying drawing and the process for dehydrohalogenating 3,4-dichlorobutene-1 to chloroprene. The process will thus be illustrated by the use of particular pieces of equipment, but it is to be understood that alternate equipment may be employed. Conventional auxiliary equipment such as pumps, auxiliary heating systems, etc., have not been shown as this type of equipment is well known to those skilled in the art.

The organic feed fed to reactor 2 through conduit 1 comprises predominantly 3,4-dichlorobutene with a small amount of 1,4-dichlorobutene and chlorinated butanes. The 3,4-dichlorobutene is dehydrochlorinated by reaction with NaOH in the aqueous caustic fed to reactor 2 through conduit 3. The dehydrochlorination reaction is conducted at temperatures of from 90° to 130°C and at atmospheric or elevated pressures.

A vaporous overhead stream comprising chloroprene, 3,4-dichlorobutene-1, 1-chlorobutadiene, water and acetaldehyde is withdrawn from reactor 2 and fed forward through conduit 4 to distillation column 5. An aqueous solution of formaldehyde is added to the reaction mixture in reactor 2 in an amount of at least about 0.5 parts by weight of formaldehyde per 1000 parts by weight of chloroprene being produced. The formaldehyde can be added in any amount desired above the critical level of 0.5 parts per 1000 parts of chloroprene being produced. It has been found that formaldehyde additions in the range of 0.5 to 50 parts per 1000 parts chloroprene being produced are acceptable. Preferably, the amount of formaldehyde added is between 0.5 to 10 parts and more preferably 0.5 to 4 parts per 1000 parts of chloroprene being produced. Reactor 2 is equipped with an agitator to maintain mixing of the reactants therein. A bottoms stream comprising predominantly water and NaCl, with minor amounts of chloroprene, dichlorobutane, acetaldehyde, dichlorobutene, vinylcyclohexene and high boiling organic residues is taken from reactor 2 and fed by conduit 6 to decanter 7. The bottoms stream breaks into an aqueous phase and an organic phase in decanter 7. The organic phase is removed and either further treated to recover various hydrocarbons therefrom or simply disposed of such as by incineration. The aqueous phase leaving decanter 7 comprises water, NaOH and residual amounts or organic compounds. The aqueous phase is fed by conduit 8 to a stripping column 9 wherein the organic compounds are stripped from the aqueous solution and taken overhead in conduit 10. The organic compounds from stripping column 9 are thus recovered and fed forward by conduit 10 to distillation column 5. Steam is admitted directly to stripping column 9 and an aqueous solution of NaCl is withdrawn from the bottom of stripping column 9 and forwarded to water treatment facilities not shown in the drawing for disposal.

Prior to the present invention, i.e., in the absence of adding formaldehyde to the reaction mixture, the decanter 7 and stripping column 9 were subject to severe fouling with a polymeric material.

The overhead from stripping column 9 and the overhead from reactor 2 are fed to distillation column 5. Steam is introduced into the bottom of column 5 to provide the boil-up in the column. A bottoms stream comprising water and 3,4-dichlorobutene-1 is recycled from column 5 to reactor 2 through conduit 12. The vaporous overhead from column 5 containing predominantly chloroprene with minor amounts of water and acetaldehyde is fed forward through conduit 13 to scrubber 14 wherein the chloroprene containing stream is contacted with an aqueous solution of sodium hydroxide to further purify the chloroprene. The aqueous caustic solution from the bottom of scrubber 14 is returned to reactor 2 through line 3. Additional NaOH as required in reactor 2 is added to the caustic solution in line 3. The purified chloroprene from scrubber 14 is forwarded to storage or for further processing.

It has been found advantageous according to the present invention to add formaldehyde to column 5. The formaldehyde can be added at either the top or the bottom of column 5 and the amount of formaldehyde to be added being at least 0.5 parts formaldehyde per 1000 parts chloroprene. Preferably, between 0.5 and 50 parts of formaldehyde per 1000 parts of chloroprene being treated in column 5 are added to column 5. The addition of formaldehyde to the distillation column 5 has also been found to reduce the fouling and plugging problems occurring in stripper 9 and decanter 7.

The invention will be further illustrated by reference to the following example of one preferred embodiment of the present invention.

Using the apparatus similar to that shown in the drawing, chloroprene was made in continuous process. Sodium hydroxide and 3,4-dichlorobutene-1 were fed to reactor 2 and allowed to react at a temperature of about 87° C and a pressure of about 5 p.s.i.g. An overhead comprising chloroprene, water, and 3,4-dichlorobutene-1 with smaller amounts of acetaldehyde and 1-chlorobutadiene was withdrawn through conduit 4 and fed forward to distillation column 5.

An aqueous emulsion comprising predominantly water and sodium chloride with lesser amounts of chloroprene, dichlorobutane, acetaldehyde, dichlorobutene vinylcyclohexene and higher boiling point organic residues was withdrawn from reactor 2 through conduit 6 and introduced into decanter 7 wherein an organic phase separated from the aqueous phase. The aqueous phase from decanter 7 was fed forward by conduit 8 to stripping column 9 wherein the remaining organic constituents contained in the aqueous phase were separated by steam distillation as overheads. The aqueous salt solution from the bottoms of stripping column 9 was discarded. The overhead from stripping column 9 was fed forward by conduit 10 to distillation column 5.

The overheads from reactor 2 and stripping column 9 were steam distilled in distillation column 5. The bottoms from distillation column 5 containing 3,4-dichlorobutene-1 and water was recycled back to reactor 2 through conduit 12. The overhead from distillation column 5 containing chloroprene with smaller amounts of water and acetaldehyde was forwarded by conduit 13 to scrubber 14 wherein the vaporous chloroprene stream was contacted with an aqueous caustic solution. The aqueous caustic solution from scrubber 14 containing small amounts of acetaldehyde and other impurities removed from the chloroprene in scrubber 14 was forwarded to reactor 2 as the source of sodium hydroxide for the dehydrochlorination reaction.

After prolonged operation, samples of the aqueous caustic from scrubber 14 were found to contain substantial amounts of sticky solids. These sticky solids were being fed with the caustic to reactor 2 and in turn withdrawn from reactor 2 in the aqueous emulsion being forwarded to decanter 7. It is believed that these sticky solid residues are the cause of the fouling and plugging of decanter and stripping column 9.

After sampling the aqueous caustic from scrubber 14, an aqueous solution of formaldehyde was fed to reactor 2 at a rate of 0.5 to 4 parts of formaldehyde per 1000 parts of chloroprene being produced. The sticky solids content of the aqueous caustic solution was reduced to essentially nil after the addition of the formaldehyde solution into reactor 2.

The concentration of acetaldehyde in the chloroprene stream from reactor 2 was dramatically reduced after the formaldehyde addition. Prior to any formaldehyde addition, the acetaldehyde was present in an amount of about 600 parts per million. At a feed of 1 part formaldehyde per 1000 parts chloroprene being produced, the acetaldehyde concentration fell to about 250 parts per million. With 2 parts formaldehyde being fed to reactor 2 per 1000 parts of chloroprene being produced, the acetaldehyde concentration fell to 100 parts per million. When the amount of formaldehyde was increased to about 4 parts per 1000 parts chloroprene being produced, the acetaldehyde concentration had declined to nil.

Similar results were obtained by adding the formaldehyde to the distillation column 5 as well as dividing the formaldehyde addition between the reactor 2 and distillation column 5.

The temperatures to be used in the dehydrohalogenation reaction can vary over a wide range, i.e., from about 50° C to about 150° C or higher. The most practical temperature range is from about 70° C to about 130° C. It is convenient to use the autogenous pressures which develop normally under the reaction conditions, however, higher or lower pressures can be used if desired.

Preferably, the reaction is carried out in the absence of oxygen to avoid subsequent reactions of the chloroprene product. It is also preferable to add polymerization inhibitors such as phenothiazine, alkyl nitrites, nitroso compounds or other compounds which inhibit polymer formation from the chloroprene.

In addition to the sodium hydroxide mentioned hereinbefore, the dehydrohalogenation reaction can be effected with other alkaline materials, especially other alkali metal hydroxides. Sodium hydroxide is preferred simply because of its ready availability. Other hydroxides which can be used include potassium hydroxide, lithium hydroxide, rubidium hydroxide, cesium hydroxide, and alkaline earth metal hydroxides such as calcium hydroxide and barium hydroxide. The hydroxide is used as an aqueous solution which may vary in concentration over a wide range, i.e., from about 2 percent up to a saturated solution.

The mole ratio of hydroxide to 3,4-dichlorobutene-1 can also vary over a wide range, i.e., from 0.5:1 to about 20:1 or higher. The upper limit of mole ratio is not critical and in general there is no advantage to using mole ratios above 20:1.

Although the invention is illustrated by the dehydrohalogenation of 3,4-dichlorobutene-1 to prepare chloroprene, it is equally useful for dehydrohalogenating 2,3,4-trichlorobutene-1 and 1,2,3,4-tetrachlorobutane to prepared 3,4-dichlorobutadiene-1,3.

What is claimed is:

1. In a continuous process for dehydrohalogenating an organic halogenated compound by reacting said organic halogenated compound selected from the group consisting of 3,4-dichlorobutene-1,2,3,4-trichlorobutene-1 and 1,2,3,4-tetrachlorobutane with an aqueous solution of a hydroxide selected from the group consisting of alkali metal hydroxides and alkaline earth metal hydroxides, to produce the corresponding dehydrohalogenated organic compound in an aqueous salt solution, said process comprising the steps of
   a. continuously feeding said organic halogenated compound and said aqueous solution of hydroxide to a reactor to form a reaction mixture,
   b. heating said reaction mixture to a temperature between 70° and 130° C thereby evolving a vaporous composition from said reaction mixture, said vaporous composition comprising predominantly the dehydrohalogenated organic compound and unreacted organic halogenated compound,
   c. withdrawing said vaporous composition from said reactor and recovering said dehydrohalogenated organic compound therefrom,
   d. continuously withdrawing a portion of said reaction mixture from said reactor to maintain a constant amount of reaction mixture in said reactor,
   e. separating said withdrawn portion of said reaction mixture into an organic phase and an aqueous phase, and stripping residual organic components from said aqueous phase, wherein the improvement comprises adding formaldehyde to the reaction mixture, said formaldehyde being present in an amount of at least 0.5 parts by weight per 1000 parts by weight of dehydrohalogenated compounds being produced.

2. A process as claimed in claim 1 wherein the formaldehyde is present in an amount of from 0.5 to 50 parts by weight per 1000 parts by weight of dehydrohalogenated compounds being produced.

3. A process as claimed in claim 1 wherein formaldehyde is added to the withdrawn vaporous composition from said reactor.

4. A process as claimed in claim 1 wherein said dehydrohalogenated organic compound which is recovered from the vaporous composition from said reactor is further contacted with an aqueous solution of said hydroxide in a scrubber, removing a vaporous stream of dehydrohalogenated organic compound, removing the aqueous solution from said contacting step containing small amounts of acetaldehyde and other impurities removed from the vaporous dehydrohalogenated organic compound, feeding said aqueous solution from the scrubber to said reactor.

5. A process as claimed in claim 4 wherein the formaldehyde is present in an amount of from 0.5 to 50 parts by weight per 1000 parts by weight of dehydrohalogenated organic compound being treated.

6. A process as claimed in claim 1 wherein said halogenated organic compound is 3,4-dichlorobutene-1.

* * * * *